(12) United States Patent
Hilbert et al.

(10) Patent No.: US 7,327,347 B2
(45) Date of Patent: Feb. 5, 2008

(54) IMAGE CLASSIFYING SYSTEMS AND METHODS

(75) Inventors: David M. Hilbert, San Jose, CA (US); William N. Schilit, Menlo Park, CA (US); Matthew L. Cooper, San Francisco, CA (US); Jonathan T. Foote, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 334 days.

(21) Appl. No.: 10/325,913

(22) Filed: Dec. 23, 2002

(65) Prior Publication Data

US 2004/0119722 A1 Jun. 24, 2004

(51) Int. Cl.
G09G 5/00 (2006.01)

(52) U.S. Cl. .............. 345/156; 345/157; 345/160; 345/163; 345/168; 345/173; 715/838; 715/840; 715/851; 715/856; 715/858

(58) Field of Classification Search ........ 345/156–172, 345/619, 173; 715/732, 737, 780, 719, 828–831
See application file for complete search history.

(56) References Cited

U.S. PATENT DOCUMENTS

| 6,317,141 | B1 * | 11/2001 | Pavley et al. ............ 715/732 |
| 6,538,698 | B1 * | 3/2003 | Anderson ............ 348/333.05 |
| 6,597,345 | B2 * | 7/2003 | Hirshberg ............... 345/168 |
| 6,744,529 | B2 * | 6/2004 | Winter et al. ............ 358/1.15 |
| 6,833,848 | B1 * | 12/2004 | Wolff et al. ............. 715/719 |
| 6,862,038 | B1 * | 3/2005 | Anderson ............. 348/207.99 |
| 2003/0031355 | A1 * | 2/2003 | Nagatsuka .............. 382/132 |
| 2003/0058275 | A1 * | 3/2003 | Pilu et al. ............... 345/751 |

OTHER PUBLICATIONS

"HOT or NOT", http://www.horornot.com.
Kuchinsky et al., "Fotofile: A Consumer Multimedia Organization and Retrieval System", ACM Conference on Human Factors in Computing Systems, CHI 15-20, pp. 496-503, May 1999.
Kang et al., "Visualization Methods for Personal Photo Collections: Browsing and Searching in the PhotoFinder", IEEE International Conference on Multimedia and Expo, ICME 2000.
Kahney, "IPhoto Completes Apple's Picture", http://www.wired.com/news/mac/0,2125,49552,00.html, Wired News, Jan. 2002.
Bederson, "Quantum Treemaps and Bubblemaps for a Zoomable Image Browser", Institute for Advanced Computer Studies, University of Maryland, pp. 1-10.

* cited by examiner

*Primary Examiner*—Richard Hjerpe
*Assistant Examiner*—Jennifer T Nguyen
(74) *Attorney, Agent, or Firm*—Sughrue Mion, PLLC; Joseph Bach

(57) ABSTRACT

Methods and systems for classifying images, such as photographs, allow a user to incorporate subjective judgments regarding photograph qualities when making classification decisions. A slide-show interface allows a user to classify and advance photographs with a one-key action or a single interaction event. The interface presents related information relevant to a displayed photograph that is to be classified, such as contiguous photographs, similar photographs, and other versions of the same photograph. The methods and systems provide an overview interface which allows a user to review and refine classification decisions in the context of the original sequence of photographs.

84 Claims, 10 Drawing Sheets

IMAGE CLASSIFYING SYSTEMS AND METHODS

BACKGROUND OF THE INVENTION

1. Field of Invention

This invention relates to image classifying methods and systems.

2. Description of Related Art

People routinely separate photographs into classes before sharing them with others. Before sharing, people typically classify photographs into those they wish to put in the family album to share with others versus those they intend to leave in an unsorted storage box.

Digital photographing opens up new worlds of opportunity for sharing and reminiscing about people's experience with others. With digital images, such as digital photographs, this kind of classification is conducted even more. This occurs because there are more ways to share, such as, for example, digital albums, cards, calendars, slide-shows, CD-ROMs, DVDs, Web pages, and email; more photographs, because, for example, people take more photographs with digital cameras than their analog counterparts; and more classifications, such as, for example, original images, touched-up images and the like.

Slide-show and light table user interfaces have been used for classifying digital photographs. For example, slide-show user interfaces are well suited for examining photographs in a close-up way to make judgments regarding the photographs' qualities. However, because such user interfaces display a single photograph at a time, slide-show interfaces are not well suited for making decisions with reference to other related photographs, such as similar photographs, or touched-up versions of the same photograph. Also, the slide-show user interfaces require complex procedures to classify photos, or sort them into separate folders.

Light table user interfaces have been used for comparing digital photographs because light table user interfaces display more than one photograph at a time. However, the more photographs that are displayed at one time on such light table user interfaces, the less resolution that is available for each photograph, making close-up examination and comparison challenging. Light table user interfaces have also been used for reviewing classification choices. Although light table user interfaces can provide an overview of photograph classification, light table user interfaces do not display a user's choices within the context of the original sequence of photographs, making it difficult for a user to see at a glance whether the user excluded photographs the user should have included, and vice versa.

SUMMARY OF THE INVENTION

This invention provides systems and methods that allow a user to classify an image with a one-key action.

This invention additionally provides systems and methods that allow a user to classify a digital photograph with the one-key action.

This invention separately provides systems and methods that allow a user to classify an image with reference to related information relevant to the image.

This invention additionally provides systems and methods that allow a user to classify a digital photograph in the context of a sequence of digital photographs in which a given digital photograph was taken.

This invention separately provides systems and methods that allow a user to classify an image with reference to other images related to that image.

This invention separately provides systems and methods that allow a user to classify an image with reference to images that are determined to be similar to that image.

This invention separately provides systems and methods that allow a user to classify an image with reference to at least one alternative version of that image.

This invention additionally provides systems and methods that allow a user to classify an image with reference to cropped and/or touched-up versions of the image.

This invention additionally provides systems and methods that allow a user to classify an image with reference to revisions of the image created by automatically applying enhancements to the image.

This invention separately provides systems and methods that allow a user to classify an image with reference to a side-by-side comparison with another image selected from the same sequence in which that image is generated.

This invention separately provides systems and methods that allow a user to review and refine image classification decisions while displaying a sequence of images in which an image is generated.

This invention additionally provides systems and methods that allow a user to review and refine image classification decisions with reference to related images relevant to a selected image.

In various exemplary embodiments of systems and methods according to this invention, a user classifies an image with a one-key action. In such exemplary embodiments, a user uses a single key or mouse click to both classify a current photograph and to advance to the next photograph.

In various exemplary embodiments of the systems and methods according to this invention, a user classifies an image with reference to a sequence of images in which the image to be classified was originally generated. In various exemplary embodiments, the user may further refer to related images relevant to the image to be classified. In various exemplary embodiments, the related images can include similar images and alternative versions of the image. In various exemplary embodiments, the user may classify the image with reference to the comparison with another image selected from the same sequence of images in which the image to be classified was originally generated.

In various exemplary embodiments of systems and methods according to this invention, a user may review and refine image classification decisions. In various exemplary embodiments, the user may review and refine the image classification decisions in reference to a sequence of images in which an image to be refined is originally generated. In various exemplary embodiments, the user may also review and refine the image classification decisions in reference to related images relevant to an image whose classification is to be refined.

This and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

In various exemplary embodiments of the system and methods according to this invention, image classifications are recorded. In various exemplary embodiments, a file system folder is created for each classification, and each image is linked or copied to an appropriate folder based on the classification of this image. In various other exemplary embodiments, each image is labeled with its classification, using a database.

Figure 1:
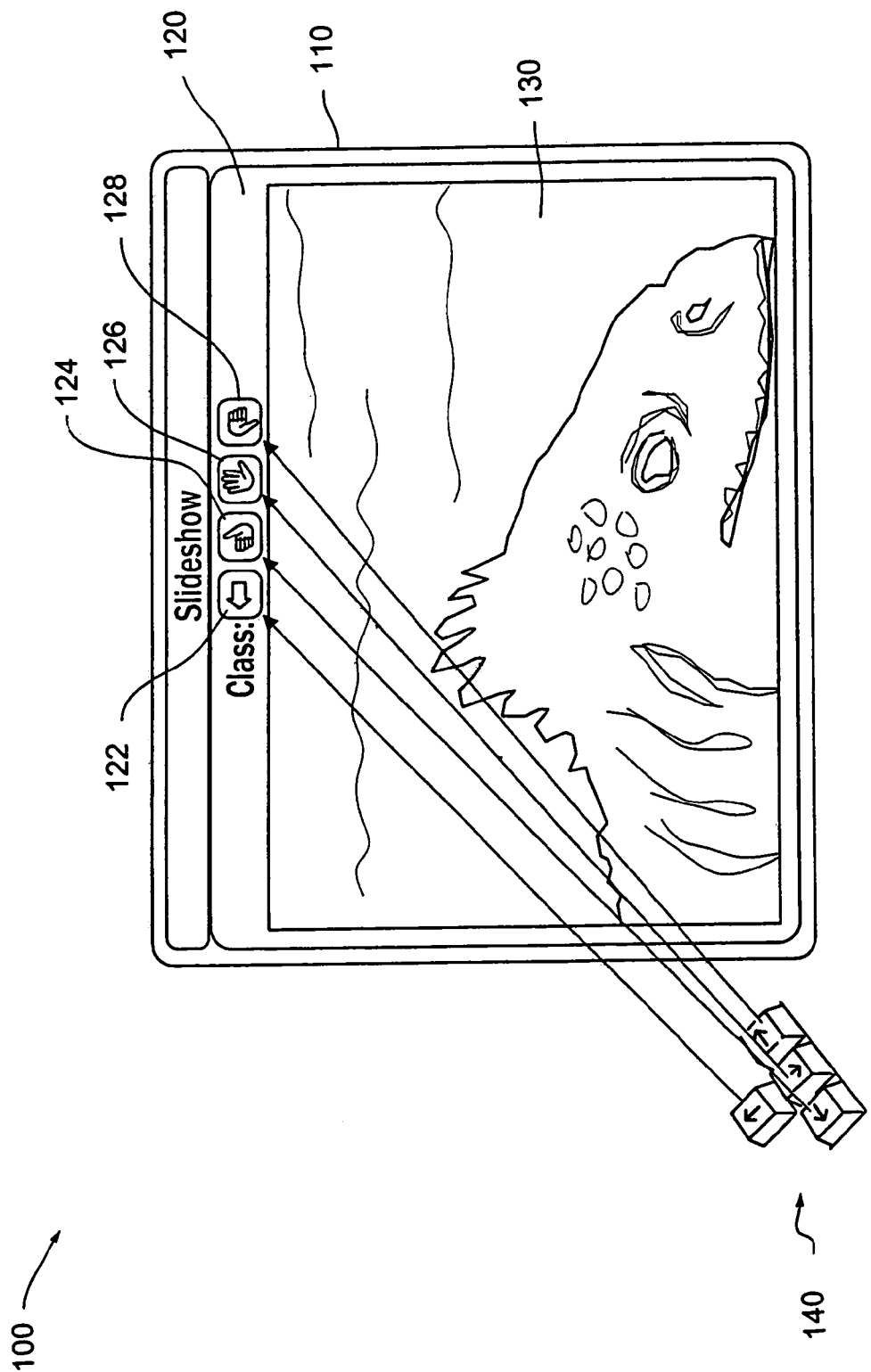
FIG. 1 illustrates a first exemplary embodiment of a user interface according to this invention.

FIG. 1 illustrates a first exemplary embodiment of a user interface usable to classify images according to this invention. As shown in FIG. 1, the user interface 100 comprises a graphical user interface 110 and an input device 140. The graphical user interface 110 comprises a classification portion 120 and an image portion 130. The image portion 130 displays images, such as digital photographs. The classification portion 120 comprises classification buttons such as a return button 122, an accept button 124, a neutral button 126 and a reject button 128. In various exemplary embodiments, the accept button 124 indicates that the user believes that the photograph shown in the image portion 130 is an acceptable photograph, the reject button 128 indicates that the photograph shown in the image portion 130 is not an acceptable photograph, and the neutral button 126 indicates that the user feels neutrally about the photograph shown in the image portion 130.

In various exemplary embodiments, the accept button 124, the neutral button 126 and/or the reject button 128, when selected, causes the image currently displayed in the image portion 130 to be classified into a corresponding classification, and automatically causes a subsequent image to be displayed in the image portion 130 in place of the current image. Thus, a one-key action, or a single graphical user interface event, is sufficient to classify each image and to advance to the next image, without requiring another action or graphical user interface event from the user.

In various exemplary embodiments, the subsequent image is the image that is next to the current image in a sequence of images in which the images were originally taken. In various other exemplary embodiments, the subsequent image is the image that is next to the current image in a sequence of images in which the user intends to classify the images.

In various exemplary embodiments, the accept button 124, the neutral button 126 and/or the reject button 128, when selected, causes the image currently displayed in the image portion 130 to be linked or copied to a file system folder corresponding to the classification of the image. In various other exemplary embodiments, the accept button 124, the neutral button 126 and/or the reject button 128, when selected, causes the image currently displayed in the image portion 130 to be labeled, using a database, with the classification of the image.

The return button 122, when selected, causes the graphical user interface to display a previous image in the image portion in place of the currently displayed image. This way, a user can return to the previous image and modify the classification assigned to the previous image.

In various exemplary embodiments, the previous image is the image that is immediately before the current image in a sequence of images in which the images were originally taken. In various other exemplary embodiments, the previous image is the image that is immediately before the current image in a sequence of images in which the user intends to classify the images.

It should be appreciated that more buttons can be added in the classification portion 120. For example, a deletion button and a modification widget may be added. Also, a "next" button may be added, such that the user can advance to the next image without classifying the current image. It should also be appreciated that one or more of the buttons 122-128 included in the classification portion 120 shown in FIG. 1 may be omitted.

It should be appreciated that the events mapped to the accept button 124, the neutral button 126 and the reject button 128, respectively, can also be mapped to, and therefore activated by the selection of, other widgets. In various exemplary embodiments, the events mapped to the accept button 124, the neutral button 126 and the reject button 128, respectively, are mapped to and activated by the selection of a set of keys of a keyboard. In various exemplary embodiments, the events mapped to the accept button 124, the neutral button 126 and the reject button 128, respectively, are mapped to and activated by the selection of a set of direction keys of a keyboard, as shown in FIG. 1. It should be appreciated that the events mapped to the accept button 124, the neutral button 126 and the reject button 128, respectively, may also be mapped to and activated by other input devices, such as mouse buttons, track ball buttons, dummy switches, joystick buttons or the like having sufficient distinct buttons, or voice commands or gestures.

Figure 2:
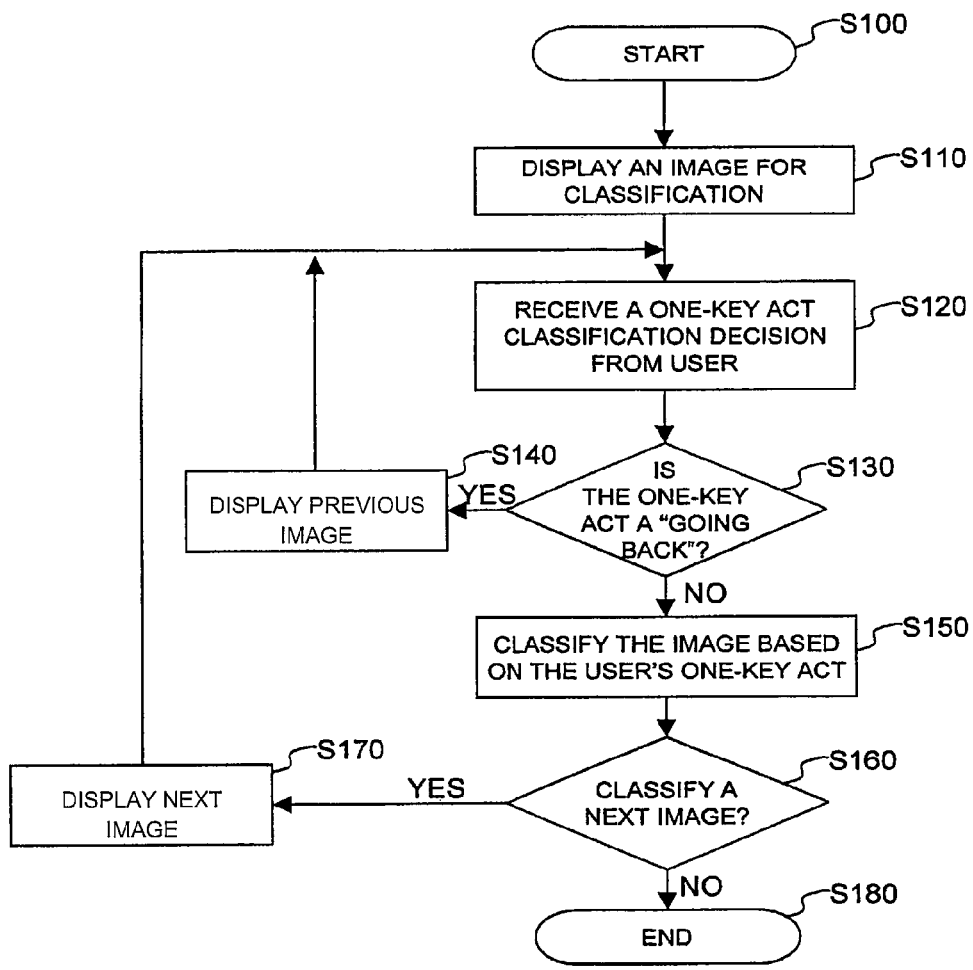
FIG. 2 is a flowchart outlining one exemplary embodiment of a first method for classifying photographs according to this invention.

FIG. 2 is a flowchart outlining one exemplary embodiment of a first method for classifying photographs according to this invention. Beginning in step S100, operation of the method continues to step S110, where an image is displayed. Then, in step S120, a user performs a one-key action to classify the displayed image. Next, in step S130, a determination is made whether the one-key action is a return button action. If so, operation jumps to step S140. Otherwise, operation jumps to step S150.

In step S140, the previous image is displayed in place of the current image. Operation then returns to step S120, where the previous image may be classified. In contrast, in step S150, the displayed image is classified according to the user's one-key action. Next, in step S160, a determination is made whether there is a next image to classify. If so, the displayed image is not the last image in an image sequence, and operation continues to step S170. Otherwise, operation jumps to step S180.

In step S170, a next image is displayed. Operation then returns to step S120, where the next image may be classified. In contrast, in step S180, operation of the method ends.

Figure 3:
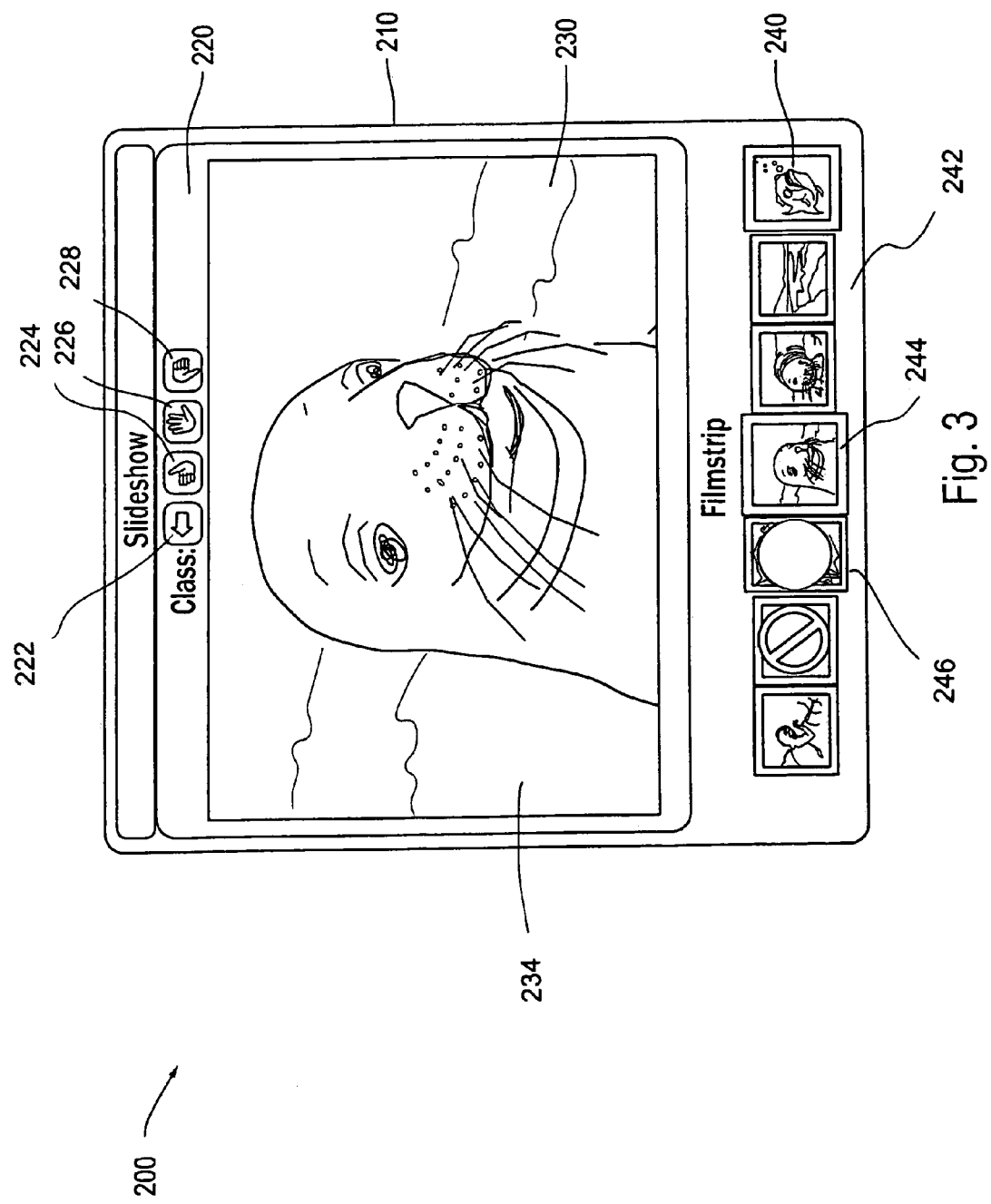
FIG. 3 illustrates a second exemplary embodiment of a user interface according to this invention.

FIG. 3 illustrates a second exemplary embodiment of a user interface 200 usable to classify images according to this invention. As shown in FIG. 3, the user interface 200 includes a graphical user interface 210. The graphical user interface 210 comprises a classification portion 220, an image portion 230, and a film strip portion 240. The classification portion 220 and the image portion 230 are similar to the classification portion 120 and the image portion 130, respectively, of FIG. 1. The classification portion 220 comprises classification buttons such as a return button 222, an accept button 224, a neutral button 226 and/or a reject button 228. The film strip portion 240 displays a sequence 242 of images.

In various exemplary embodiments, the sequence 242 of the images displayed in the film strip portion 240 is a series of digital photographs arranged in the sequence in which the digital photographs were taken. In various exemplary embodiments, the sequence 242 is arranged horizontally from the left hand side of the film strip portion 240 to the right hand side of the film strip portion 240, with the digital photographs that were taken earlier in the sequence 242 displayed on the left and those taken later on the right.

It should be appreciated that the sequence 242 can start from the right-hand side and end at the left-hand side. It should also be appreciated that the sequence 242 can be arranged in other orientations, such as vertical and diagonal directions. In addition, it should be appreciated that the film strip portion 240 can be placed at different locations within the graphical user interface 200, such as at a location above or to one side of the image portion 230.

Each of the images in the sequence 242 displayed in the film strip portion 240 may be highlighted by an input or selection device, such as a mouse, a track ball, a keyboard or the like. In various exemplary embodiments, the highlighting is activated by simply placing a pointer of the input or selection device over a selected image 244 in the sequence 242. In various other exemplary embodiments, the highlighting is activated by an affirmative selection, such as a click of the mouse, over the selected image 244.

In various exemplary embodiments, when the selected image 244 is highlighted, an enlarged image 234 of the selected image 244 is displayed in the image portion 230. The enlarged image 234 enables a user to have a close-up look at the selected image 244. The user may classify the selected image by performing a one-key action using the buttons 222-228 provided in the classification portion 220. After an image is classified, the highlight automatically advances to the next image in the sequence 242 as displayed in the film strip portion 240. Accordingly, the newly highlighted image becomes the newly selected image and an enlarged image 234 of the newly selected image is displayed in the image portion 230.

In various exemplary embodiments, the classification state and/or status of the images that have been classified are indicated in the film strip portion 240. For example, as shown in FIG. 3, an image 246 on the left-hand side of the selected image 244 that has been classified is displayed with a symbol that indicates the classification assigned to that image.

In various exemplary embodiments, different classification indications in the film strip portion 240 are associated with different visual-effect representations, such as colors, image qualities, and symbols, to provide easy and quick visual identification of the classification indications. In various exemplary embodiments, the accepted, reject and neutral images are associated with green, red and yellow frames, respectively. It should be appreciated that in various other exemplary embodiments, different classification indications and/or different classifications may be used.

In various exemplary embodiments, a reject image is indicated as a faded or filtered image. In such a faded image, the image quality is degraded by, for example, reduced contrast or brightness. Thus, the features in the faded image are still visible, but not as clear as the features in an accepted, normal image.

In various exemplary embodiments, the location of each image in the sequence 242 shown in the film strip portion 240 remains unchanged during a classification session, with the highlighting of the selected image shifting from the left to the right as each image in sequence 242 is selected and classified in turn. In various other exemplary embodiments, the sequence 242 of the images shown in the film strip portion 240 is automatically updated during the classification session. In various exemplary embodiments, when the classification of a selected image is made and a new image is selected, the images in the sequence 242 displayed in the film strip portion 240 are shifted to the left, with the left most image being pushed off the film strip portion 240, and a new image is added to the sequence 242 on the right-hand side of the film strip portion 240. This way, the position of the automatically-selected image is steady at a certain position, such as the center of the film strip portion 240.

As shown in FIG. 3, the user can refer to a sequence of images in which a photograph is taken, so that the user can make a more informed decision regarding the classification of a selected photograph. This is particularly useful when the user takes multiple photographs of the same subject matter in order to choose the user's favorites at a later time.

Figure 4:
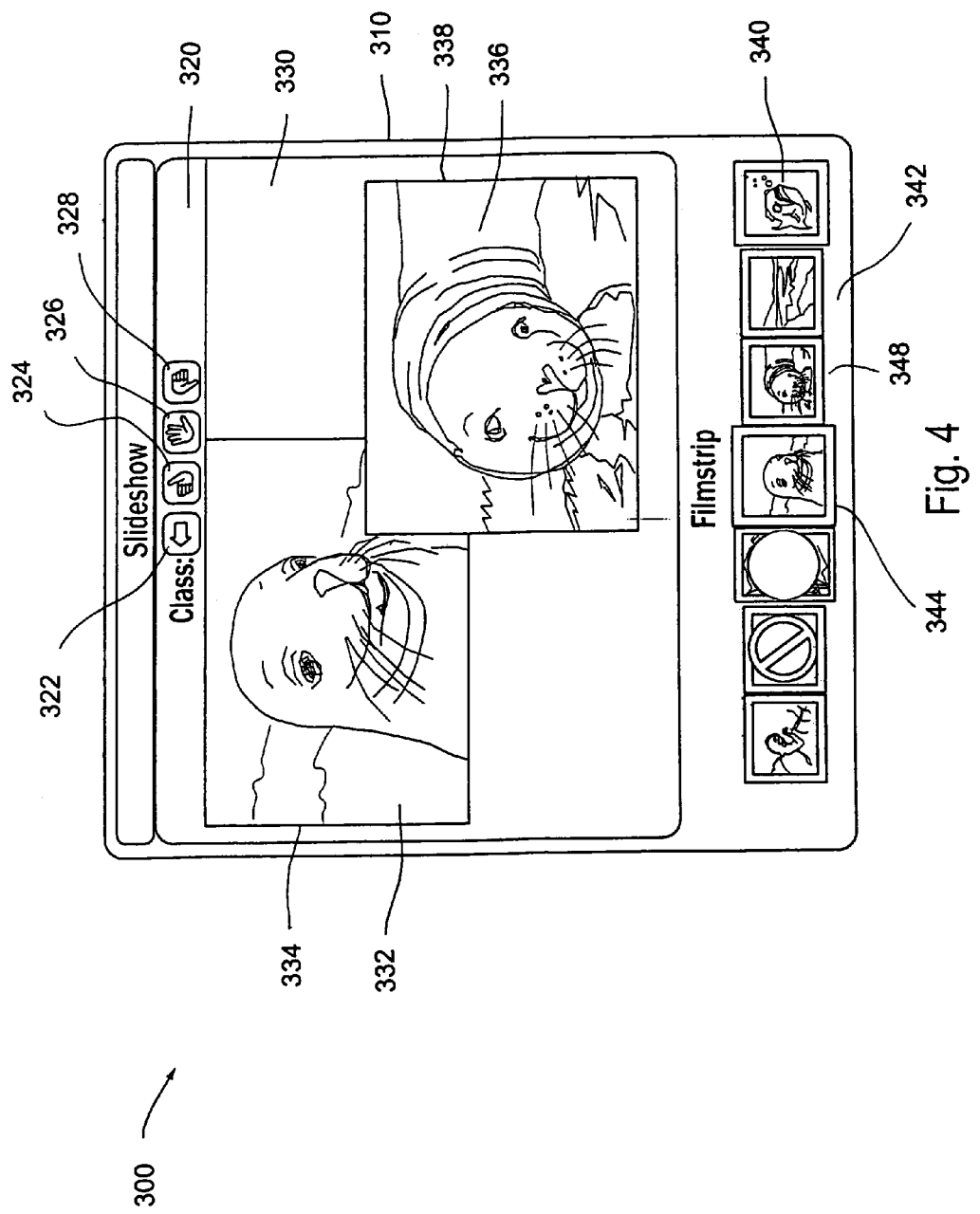
FIG. 4 illustrates a third exemplary embodiment of a user interface according to this invention.

FIG. 4 illustrates a third exemplary embodiment of a user interface 300 usable to classify images according to this invention. As shown in FIG. 4, the user interface 300 includes a graphical user interface 310. The graphical user interface 310 comprises a classification portion 320, an image portion 330, and a film strip portion 340. The classification portion 320 and the image portion 330 are similar to the classification portion 120 and the image portion 130, respectively, of FIG. 1. The classification portion 320 comprises classification buttons, such as a return button 322, an accept button 324, a neutral button 326 and/or a reject button 328. The film strip portion 340 displays a sequence 342 of images. In various exemplary embodiments, the sequence 342 displayed in the film strip portion 340 is a series of digital photographs arranged in the sequence 342 in which the digital photographs were taken.

In various exemplary embodiments, the display portion 330 is used to display two or more enlarged images. As shown in FIG. 4, a first enlarged image 334 is displayed at a first display position 332 within the image portion 330. A second enlarged image 338 is displayed at a second display position 336 within the image portion 330. In various exemplary embodiments, the first enlarged image 334 corresponds to an image 344 displayed within the film strip 340 that is automatically selected upon classifying the previous image. The second enlarged image 338 corresponds to an image 348 displayed in the film strip portion 340 that is selected by the user. In various exemplary embodiments, the image 348 is selected by the user by highlighting the image 348.

In various exemplary embodiments, the first display position 332 and the second display position 336 are arranged side-by-side, so that the user can review the first enlarged image 334 and the second enlarged image 338 simultaneously to decide a classification for at least the first enlarged image 334. In various other exemplary embodiments, the first display position 332 is arranged vertically above the second display position 336 so the user can simultaneously view the first and the second enlarged images 334 and 338. In various other exemplary embodiments, the first and the second display positions 332 and 336 are arranged in other positional relations, such as in a diagonal relation. In various other exemplary embodiments, the positions of the first and the second display positions 332 and 336 can be adjusted by the user.

Figure 5:
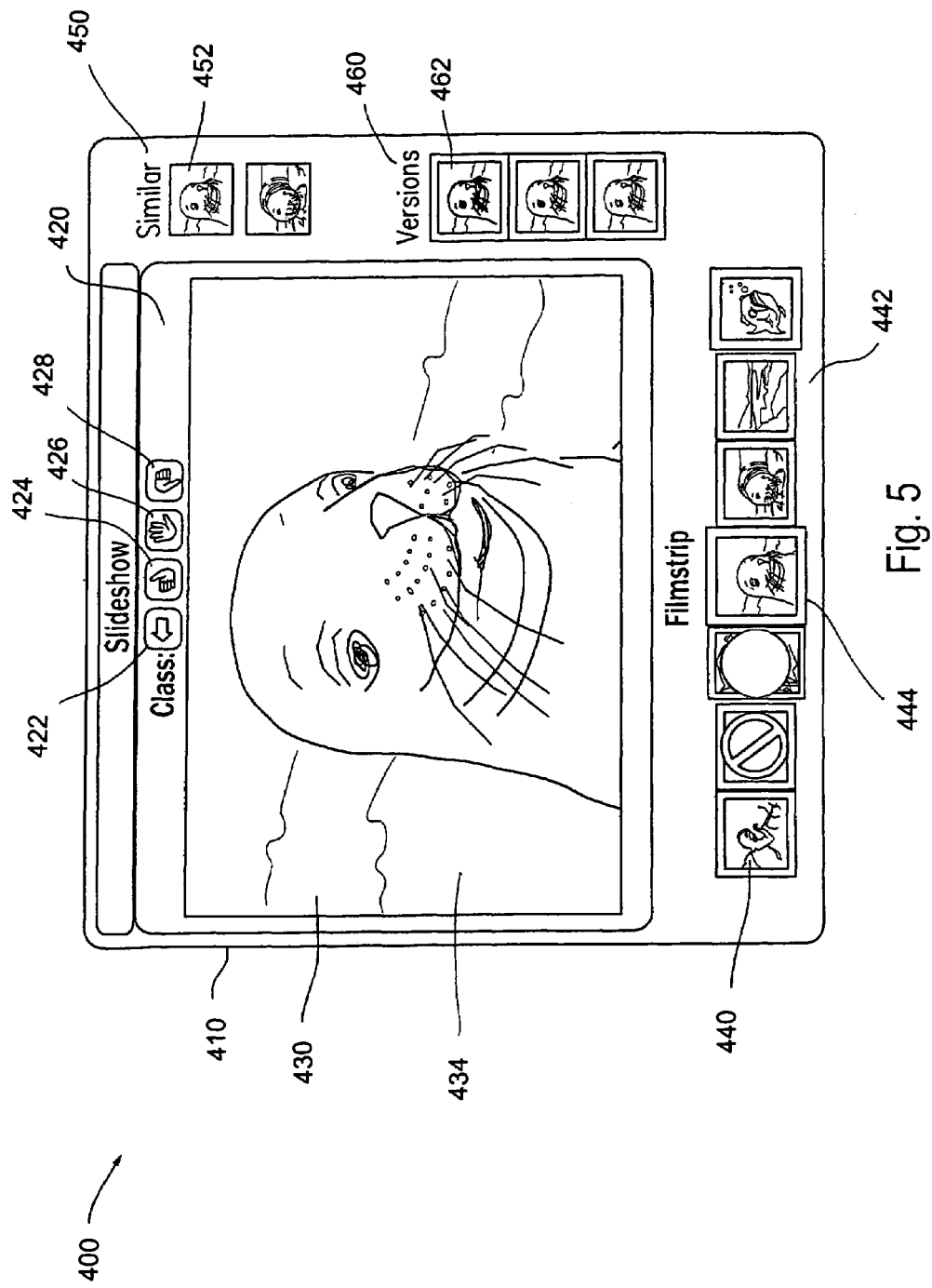
FIG. 5 illustrates a fourth exemplary embodiment of a user interface according to this invention.

FIG. 5 illustrates a fourth exemplary embodiment of a user interface 400 usable to classify images according to this invention. As shown in FIG. 5, the user interface 400 includes a graphical user interface 410. The graphical user interface 410 includes a classification portion 420, an image portion 430, and a film strip portion 440. The classification portion 420 and the image portion 430 are similar to the classification portion 120 and the image portion 130, respectively, of FIG. 1. The classification portion 420 comprises classification buttons, such as a return button 422, an accept button 424, a neutral button 426 and/or a reject button 428. The film strip portion 440 displays a sequence 442 of images. In various exemplary embodiments, the sequence 442 displayed in the film strip portion 440 is a series of digital photographs arranged in the sequence 442 in which the digital photographs were taken.

In various exemplary embodiments, the display portion 430 is used to display an enlarged image 434, which corresponds to an image 444 displayed in the film strip portion 440. In various exemplary embodiments, the image 444 is automatically selected in response to the classification of the previous image. In various exemplary embodiments, the image 444 is selected by the user. In various exemplary embodiments, the image 444 is selected by the user by highlighting the image 444, in a way similar to highlighting the image 244 of FIG. 3, as discussed above.

As shown in FIG. 5, the graphical user interface 410 further comprises a similar image portion 450 and a version portion 460. The similar image portion 450 displays zero, one or more similar images 452 that are determined to be related to or similar to the selected image 444. In various exemplary embodiments, the zero, one or more similar images 452 are determined to be related to or similar to the selected image 444 based on computed similarities. The zero, one or more similar images 452 are retrieved and displayed in the similar image portion 450 when the selected image 444 is selected.

The version portion 460 displays zero, one or more alternative version images 462 of the selected image 444. The zero, one or more alternative version images 462 include modified images, such as cropped or touched-up versions, of the selected image 444. In various exemplary embodiments, the zero, one or more alternative version images 462 are created manually. In various other exemplary embodiments, the zero, one or more alternative version images 462 are created automatically by applying one or more image enhancements, such as, for example, color, contrast, and/or saturation enhancements. The zero, one or more alternative version images 462 are retrieved and/or automatically created when the selected image 444 is selected from the sequence 442 displayed in the film strip portion 440. It should be appreciated that, in some exemplary embodiments, one or both of the similar image portion 450 and the version portion 460 can be omitted. Likewise, other portions can be added to display related information, such as an overview of the images the user has already classified. In various exemplary embodiments, the film strip portion 440 is omitted. In such exemplary embodiments, the display portion 430 displays an enlarged image 434 that corresponds to an image in a sequence which is not shown. The similar portion 450 and the version portion 460 show similar images 452 and alternative images 462, respectively, of the enlarged image 434.

Figure 6:
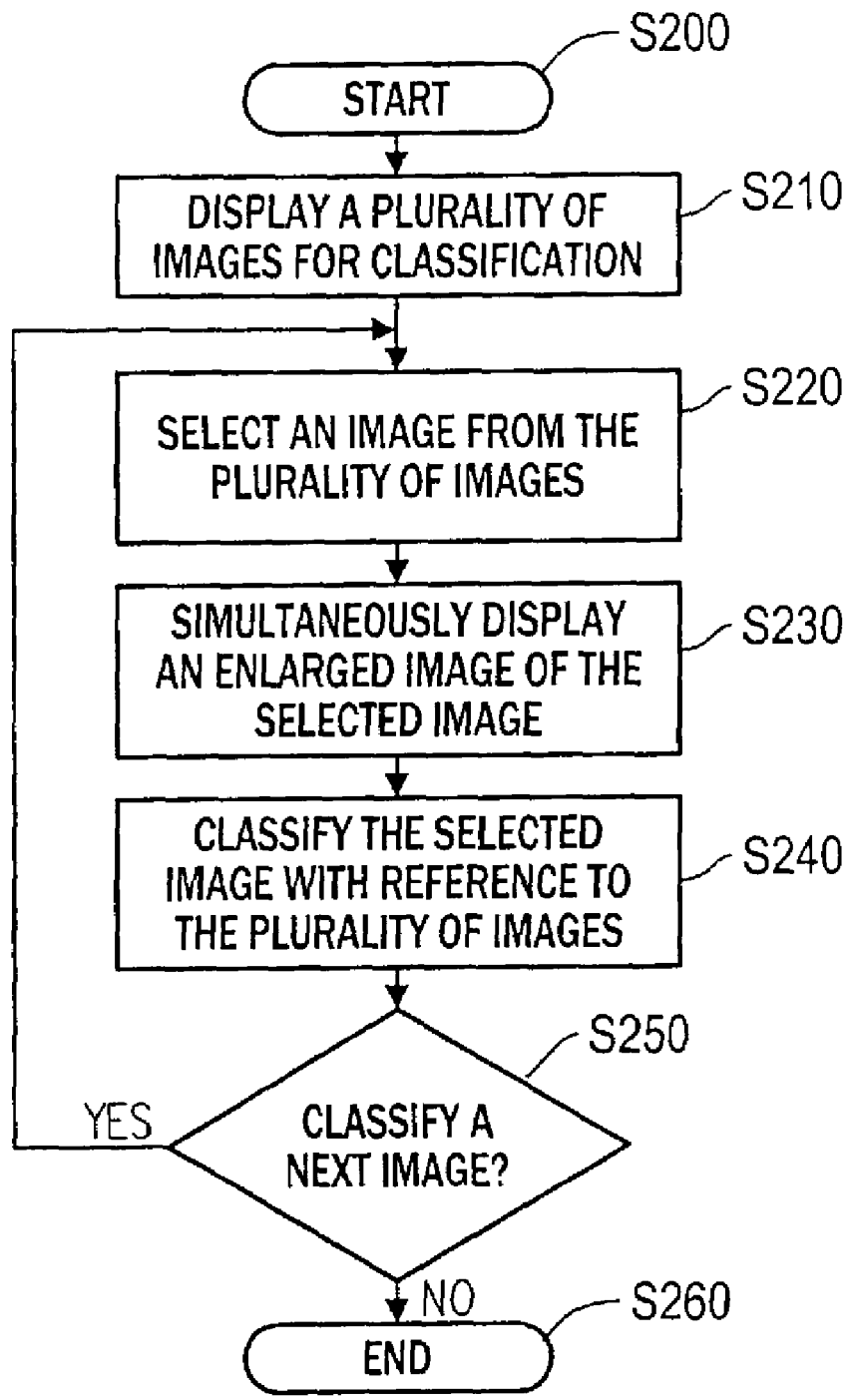
FIG. 6 is a flowchart outlining one exemplary embodiment of a second method for displaying and classifying images according to this invention.

FIG. 6 is a flowchart outlining one exemplary embodiment of a second method for displaying and classifying images according to this invention. Beginning in step S200, operation of the method continues to step S210, where a sequence of images is displayed for classification. Then, in step S220, an image of the displayed sequence is selected from the displayed sequence. In various exemplary embodiments, the selected image is automatically selected in response to a prior image being classified. In such exemplary embodiments, when there is no prior image that has been classified, the first image in the displayed sequence of images, such as the first image in the sequence of digital photographs, is selected as default. In various other exemplary embodiments, the image is selected manually by the user by highlighting a selected image. Next, in step S230, an enlarged image corresponding to the selected image is displayed. Operation then continues to step S240.

In step S240, the selected image is classified by the user performing a one-key action. Next, in step S250, a determination is made whether there are anymore images to be classified. If so, operation jumps to step S220, where another image is automatically selected. Otherwise, operation proceeds to step S260, where operation of the method ends.

In various exemplary embodiments, additional steps can be performed between steps S230 and S240 to display two or more enlarged images simultaneously, as discussed above in connection with FIG. 4. In various other exemplary embodiments, additional steps can be performed between steps S230 and S240 to display related information, such as images that are similar to the selected image and alternative versions of the selected image, as discussed above in connection with FIG. 5.

Figure 7:
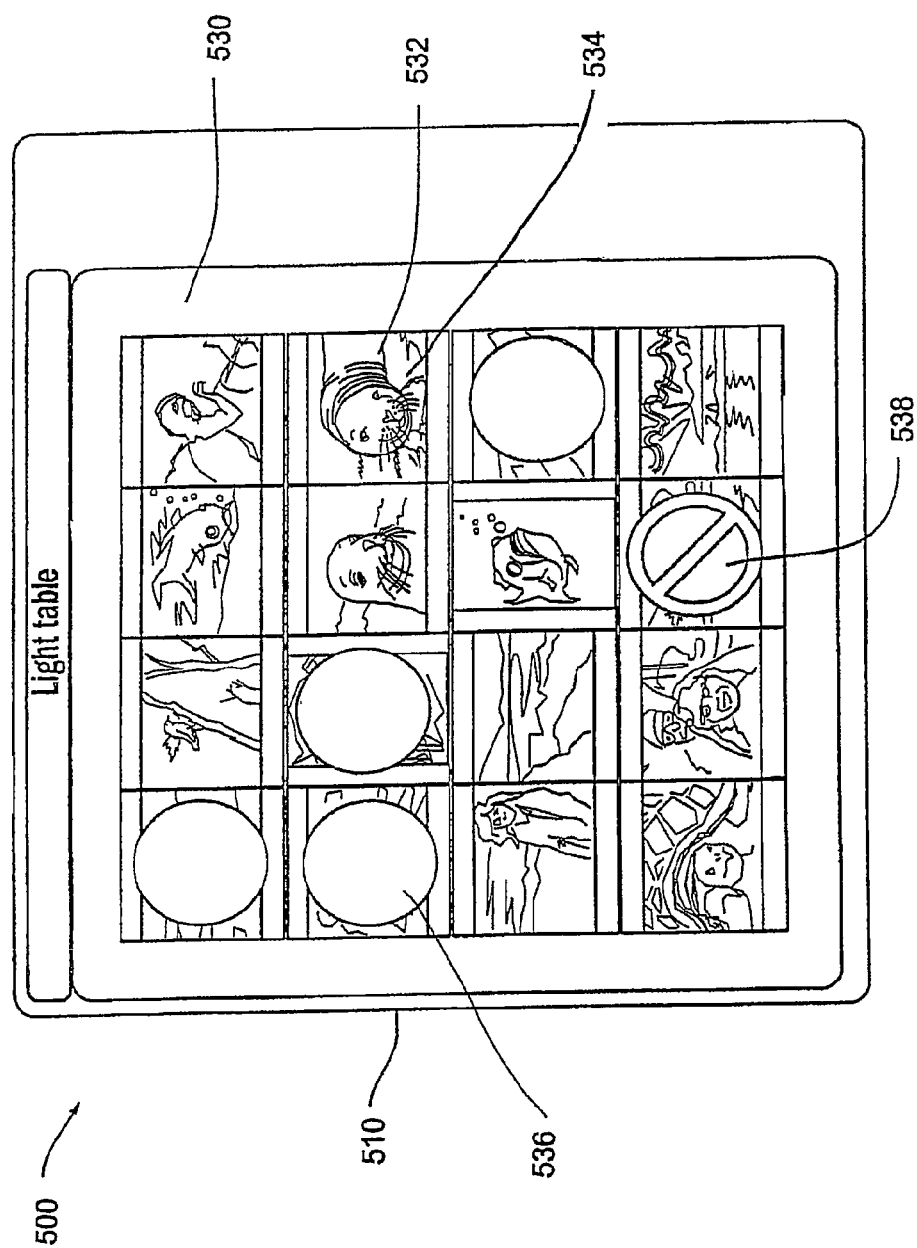
FIG. 7 shows a fifth exemplary embodiment of a user interface according to this invention.

FIG. 7 shows a fifth exemplary embodiment of a user interface 500 usable to review and refine image classification decisions according to this invention. As shown in FIG. 7, the user interface 500 includes a graphical user interface 510. The graphical user interface 510 includes an image display portion 530. A sequence 532 of images is displayed in the image display portion 530. Each image in the sequence 532 has been classified, and the classification for each image in the sequence 532 is indicated in the image display portion 530. Each image in the sequence 532 displayed in the image display portion 530 can be selected to change that image's classification.

In various exemplary embodiments, the sequence 532 is a series of digital photographs arranged in a sequence in which the photographs were taken. In various exemplary embodiments, the sequence starts at the upper-left-hand corner of the image display portion 530, continues horizontally to the right-hand side until the upper right corner of the image display portion 530, then repeats a next row. In various other exemplary embodiments, the sequence starts at the upper-left-hand corner of the image display portion 530, continues vertically down to the lower-left-hand corner of the image display portion 530, then repeats a next column. It should be appreciated that the sequence 532 of images can be arranged in other ways.

In various exemplary embodiments, each image in the sequence 532 displayed in the image display portion 530 has been classified as accepted, neutral or rejected. As shown in FIG. 7, an image 534 contains an indication that that image is an accepted image, an image 536 contains an indication that that image is a neutral image, and an image 538 contains an indication that that image is a reject image.

In various exemplary embodiments, different classification indications are associated with different visual-effect representations, such as colors, image qualities, and symbols, to provide easy and quick visual identification of the classification indications. In various exemplary embodiments, the accepted, reject and neutral images are associated with green, red and yellow frames, respectively. It should be appreciated that in various other exemplary embodiments, different classification indications and/or different classifications may be used.

In various exemplary embodiments, a reject image is indicated as a faded or filtered image. In such a faded image, the image quality is degraded by, for example, reduced contrast or brightness. Thus, the features in the faded image are still visible, but not as clear as the features in an accepted, normal image.

As discussed above, in various exemplary embodiments, each image in the sequence 532 displayed in the image display 530 can be selected to change its classification. In various exemplary embodiments, an image is selected by highlighting the image. In various exemplary embodiments, when an image is selected, a classification portion (not shown) is activated or displayed. The classification portion is similar to the classification portion 120 shown in FIG. 1. Upon activating a classification button of the classification portion, the selected image can be reclassified. In various other exemplary embodiments, each image in the sequence 532 may be reclassified using a context menu or drag-and-drop technique, so that the user can see the results of the reclassification immediately.

Figure 8:
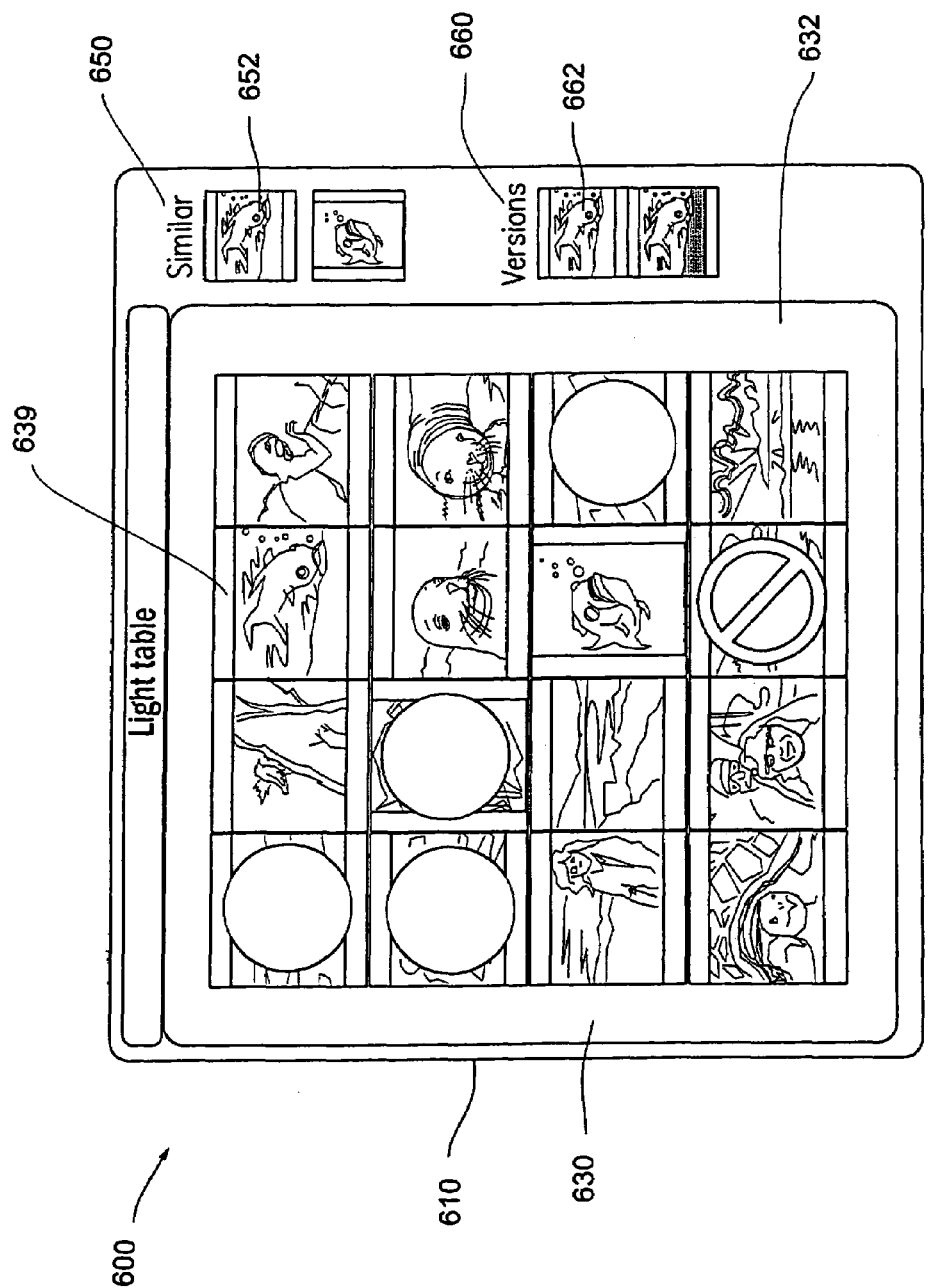
FIG. 8 shows a sixth exemplary embodiment of a user interface according to this invention.

FIG. 8 shows a sixth exemplary embodiment of a user interface 600 according to this invention. In this exemplary embodiment, classified images are reviewed for possible refinement or reclassification. As shown in FIG. 8, the user interface 600 includes a graphical user interface 610. The graphical user interface 610 includes an image display portion 630. A sequence 632 of images is displayed in the image display portion 630. Each image in the sequence 632 has been classified. The classification of each image in the sequence 632 is indicated in the image display portion 630. Each image in the sequence 632 displayed in the image display portion 630 can be selected to change its classification. In various exemplary embodiments, an image is selected by highlighting that image. In various exemplary embodiments, the sequence 632 is a serious of digital photographs arranged in a sequence in which the photographs were taken.

As shown in FIG. 8, the graphical user interface 600 further includes a similar image portion 650 and a version portion 660. Similar to the similar image portion 450 and the version portion 460, respectively, of FIG. 5, the similar image portion 650 and the version portion 660 display zero, one or more similar images 652 and zero, one or more alternative version images 662 for a selected image 639 displayed in the image display portion 630. The similar images 652 and the alternative version images 662 are related to the selected image 639 in a way similar to that in which the similar images 452 and the alternative version images 462 of FIG. 5 are related to the selected image 444.

Figure 9:
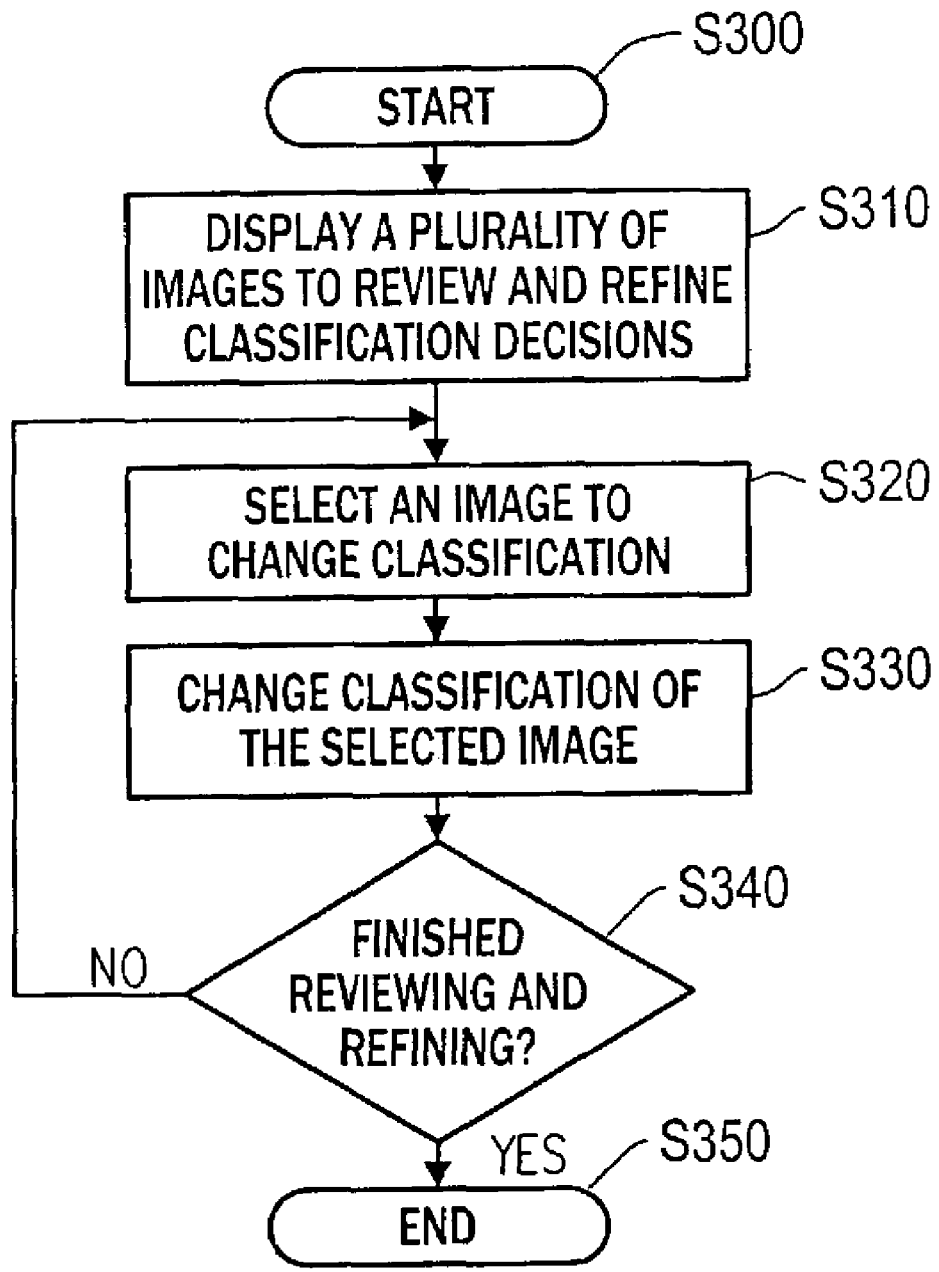
FIG. 9 is a flowchart outlining one exemplary embodiment of a method for reviewing and refining images classification decisions according to this invention.

FIG. 9 is a flowchart outlining one exemplary embodiment of a method for reviewing and refining image classification decisions according to this invention. Beginning in step S300, operation of the method continues to step S310, where an image sequence is displayed. Then, in step S320, one image in the image sequence is selected. Next, in step S330, the classification of the selected image is changed or refined. Operation then continues to step S340.

In step S340, a determination is made whether there are any more images to be reviewed and/or reclassified. If so, operation returns to step S320, where the selection of another image is performed. Otherwise, if not, operation continues to step S350, where operation of the method ends.

In FIG. 9, between steps S320 and S330, one or more additional steps may be included to retrieve and/or to display related information relevant to a selected image. The related information includes similar images 652 and/or alternative version images 662, as discussed above in connection with FIG. 8.

Figure 10:
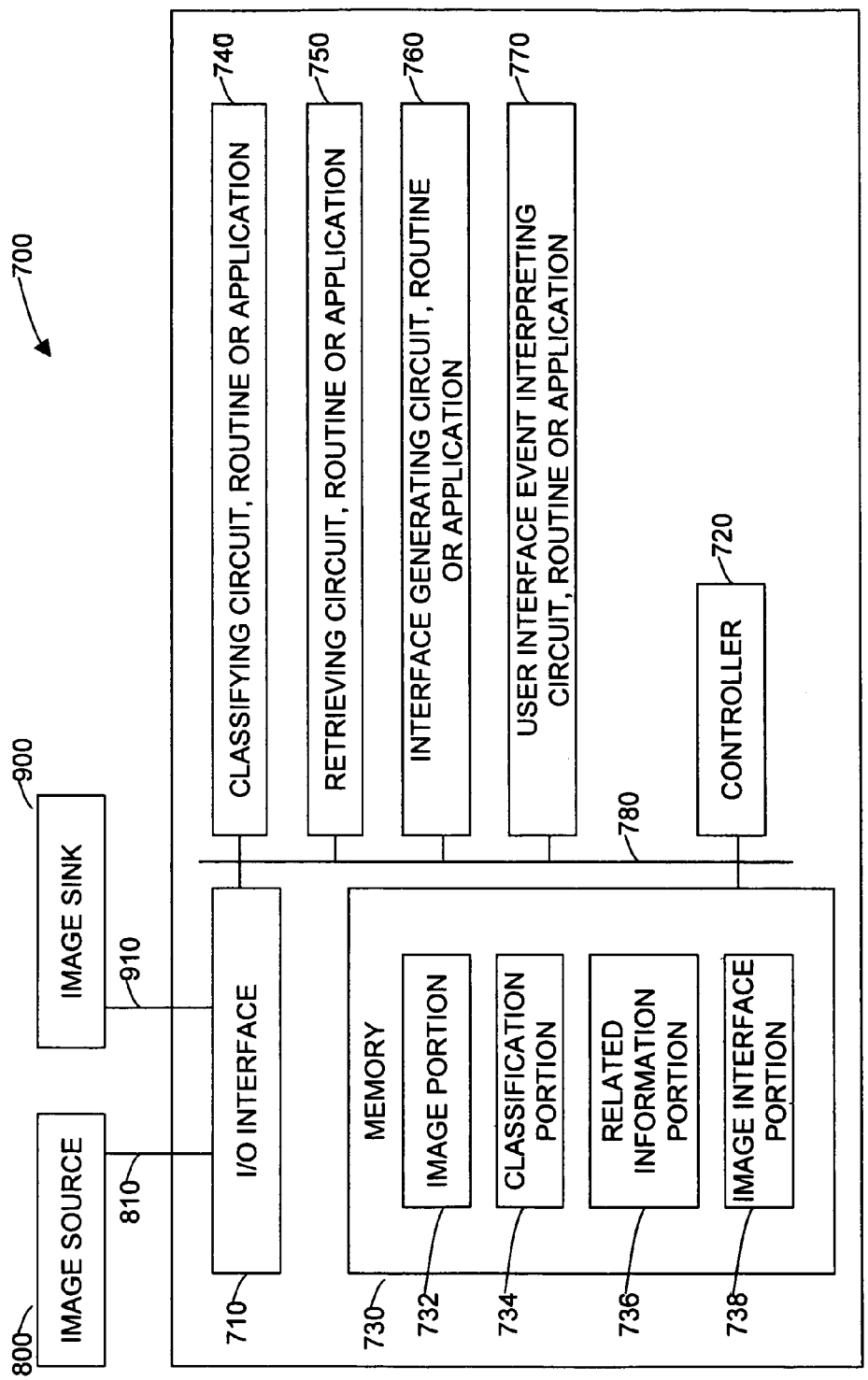
FIG. 10 is a functional block diagram of one exemplary embodiment of an image classification system according to this invention.

FIG. 10 is a block diagram outlining one exemplary embodiment of an image classification system 700 according to this invention. As shown in FIG. 10, the image classification system 700 includes an input/output (I/O) interface 710, a controller 720, a memory 730, a classifying circuit, routine or application 740, a retrieving circuit, routine or application 750, an interface generating circuit, routine or application 760, and a user interface event interpreting circuit, routine or application 770, each interconnected by one or more controlled and/or data busses and/or application programming interfaces 780.

As shown in FIG. 10, the image classification system 700 is, in various exemplary embodiments, implemented on a programmed general-purpose computer. However, the image classification system 700 can also be implemented on a special-purpose computer, a programmed micro processor or micro controller and peripheral integrated circuit elements, an ASIC or other integrated circuits, a digital signal processor (DSP), a hard wired electronic or logic circuit such as a discrete element circuit, a programmable logic device such as a PLD, PLA, FPGA or PAL, or the like. In general, any device capable of implementing a finite state machine that is in turn capable of implementing the flowcharts shown in FIGS. 2, 6 and/or 9, can be used to implement the image classification system 700.

The I/O interface 710 interacts with the outside of the system. For example, the I/O interface 710 receives images from an image source 800 over a link 810. The 110 interface 710 also outputs classified images to an image sink 900 over a link 910. The I/O interface 710 also interacts with users through one or more user input devices (not shown) and one or more display devices (not shown). The one or more display devices may be a display screen, an interactive screen, or the like. The one or more user input devices may be a mouse, a track ball, a keyboard, a joystick, or the like. The one or more user input devices may also be dummy switches displayed on the one or more display devices.

As shown in FIG. 10, the memory 730 includes an image portion 732, a classification portion 734, a related information portion 736, and a user interface portion 738. The memory 730 can be implemented using any appropriate combination of alterable, volatile or nonvolatile memory or nonalterable or fixed memory. The alterable memory, whether volatile or nonvolatile, can be implemented using any one or more of static or dynamic RAM, a floppy disk and disk drive, a writeable or rewriteable optical disk and disk drive, a hard drive, flash memory, or the like. Similarly, the nonalterable or fixed memory can be implemented using any one or more of ROM, PROM, EPROM, EEPROM, an optical ROM disc, such as a CD-ROM or a DVD-ROM disc, and disc drive or the like. The image portion 732 stores images received at the I/O interface 710. The classification portion 734 stores image classifications and/or classified images. The related information portion 736 stores information related to images, such as alternative version images. The user interface portion 738 stores information for interfacing with users during classification processes.

In the image classification system 700 shown in FIG. 10, the interface generating circuit, routine or application 760 receives images from the I/O interface 710, and transfers classified images to the I/O interface 710. The interface generating circuit, routine or application 760 also transfers images to the one or more display devices for display. The user interface event interpreting circuit, routine or application 770 receives a user's input through the one or more user input devices and the input/output interface 710 and interprets the user's classification decisions represented by the received user inputs. The classifying circuit, routine or application 740 classifies images according to the interpreted classification decisions.

The retrieving circuit, routine or application 750 retrieves related information for selected images and transfers the related information to the one or more display devices for display. The retrieving circuit, routine or application 750 retrieves related information for a selected image by determining images that are similar to the selected image. The retrieving circuit, routine or application 750 also retrieves related information for a selected image by retrieving alternative image versions of the selected image stored in the related information portion 736.

The image source 800 can be any one or more of a number of different image sources such as a digital camera, a digital copier, a facsimile device, a scanner, or a locally or remotely located computer, or any other known or later developed device that is capable of generating electronic images. Similarly, the image source 800 can be any suitable device that stores and/or transmits electronic images, such as a client or a server of a network, or the Internet, and especially the Word Wide Web. In various exemplary embodiments, the image source 800 can be integrated with the I/O interface 710, as in a digital camera having an integrated image classifier. In various other exemplary embodiments, the image source 800 can be connected to the I/O interface 710 over a connection device, such as a modem, a local area network, a wide area network, an intranet, the Internet, any other distributed processing network, or any other known or later-developed connection device.

It should be appreciated that, while the images can be generated at the time of taking digital photograph photographs, the images could have been generated at any time in the past. The image source 800 can thus include any known or later developed device which is capable of supplying electronic images to the I/O interface 710. For example, the image source 800 may be a data carrier such as a magnetic storage disc, CD-ROM, or the like, or a host computer that contains images. Thus, the image source 800 can be any known or later-developed source that is capable of providing images to the image classification system 700 according to this invention. Similarly, the image sink 900 can be any known or later-developed device that is capable of receiving classified images output by the image classification system 700 and either storing, transmitting, or displaying the classified images.

In an exemplary operation in which a user classifies images by performing one-key actions according to this invention, the interface generating circuit, routine or application 760, under control of the controller 720, displays, at the one or more display devices, an image in an image sequence from the image portion 732. The interface generating circuit, routine or application 760, under control of the controller 720, also displays a plurality of one-key action classification buttons, such as the classification buttons 122-128 shown in FIG. 1, from the user interface portion 738.

When the user selects, using a one-key action, one of the classification buttons at the one or more user input devices, the user interface event interpreting circuit, routine or application 770 receives the one-key action from the user and, under control of the controller 720, interprets the event associated with the user's one-key action. When the user's one-key action indicates a "return," the interface generating circuit, routine or application 760, under control of the controller 720, displays a previous image in the image sequence at the one or more display devices.

On the other hand, when the user's one-key action indicates a classification decision, the user interface event interpreting circuit, routine or application 770, under control of the controller 720, interprets the user's classification decision, such as "accept," "neutral" and "reject," of the currently displayed image. The classifying circuit, routine or application 740, under control of the controller 720, classifies the currently-displayed image according to the interpreted classification decision, and stores the classification in the classification portion 734. The interface generating circuit, routine or application 760, under control of the controller 720, automatically and without any further input from the user, displays a next image, if any, in the image sequence for classification.

In an exemplary operation in which a user classifies an image with reference to related information, the interface generating circuit, routine or application 760, under control of the controller 720, displays an image sequence, such as the image sequence 242 shown in FIG. 3, at the one or more display devices. The interface generating circuit, routine or application 760, under control of the controller 720, also displays an enlarged image, such as the enlarged image 234 shown in FIG. 3, corresponding to a current image in the image sequence. The current image is typically indicated, such as highlighted, in the image sequence. At the beginning of a classification process, the current image is typically the first image in the image sequence. On the other hand, during the classification process, the current image is typically the image which is in a position to be classified.

The interface generating circuit, routine or application 760, under control of the controller 720, also displays a plurality of one-key action classification buttons, such as the classification buttons 122-128 shown in FIG. 1. When a user selects one of the classification buttons at the one or more user input devices using a one-key action, the user interface event interpreting circuit, routine or application 770 receives the one-key action from the user and, under control of the controller 720, interprets the event associated with the user's one-key action. When the user's one-key action indicates a "return," the interface generating circuit, routine or application 760, under control of the controller 720, displays a previous image in the image sequence at the one or more display devices.

On the other hand, when the user's one-key action indicates a classification decision, the user interface event interpreting circuit, routine or application 770, under control of the controller 720, interprets the user's classification decision, such as "accept," "neutral" and "reject," of the currently displayed image. The classifying circuit, routine or application 740, under control of the controller 720, classifies the currently displayed image according to the interpreted classification decision, and stores the classification in the classification portion 734. The interface generating circuit, routine or application 760, under control of the controller 720, displays a classification mark for the classified image in the image sequence, and automatically and without any further input from the user, shifts the highlighting to a next image, if any, in the displayed image sequence for classification. Accordingly, the interface generating circuit, routine or application 760, under control of the controller 720, displays an enlarged image corresponding to the newly highlighted image in the image sequence.

However, when the user's input is a selection of another image in the image sequence, instead of a one-key classification action using one of the classification buttons, the interface generating circuit, routine or application 760, under control of the controller 720, may also display another enlarged image which corresponds to the selected another image in the image sequence. This other image in the image sequence is typically selected by the user because the user desires to compare this other image with the image to be classified. Accordingly, this other enlarged image is typically displayed together with the enlarged image that corresponds to the image to be classified. An example of a display of two enlarged images is shown in FIG. 4.

Furthermore, the interface generating circuit, routine or application 760, under control of the controller 720, may also display related information related to the image to be classified, such as the similar images 452 and the alternative version images 462 shown in FIG. 5, for the user to refer to during the classification process. That is, for an image to be classified, the retrieving circuit, routine or application 750, under control of the controller 720, retrieves related information that is related to the image to be classified. The interface generating circuit, routine or application 760, under control of the controller 720, displays the related information within, for example, a similar image portion and/or a version portion.

In an exemplary operation in which a user reviews and refines image classifications, the interface generating circuit, routine or application 760, under control of the controller 720, displays an image sequence, such as the image sequence 532 shown in FIG. 7, on the one or more display devices. The retrieving circuit, routine or application 750, under control of the controller 720, retrieves image classifications for each image from the classification portion 734. The interface generating circuit, routine or application 760, under control of the controller 720, displays the retrieved classifications together with the images.

When the user selects an image, the interface generating circuit, routine or application 760, under control of the controller 720, displays a classification portion, such as the classification portion 120 shown in FIG. 1, so that the user can reclassify the selected image by selecting a classification key, such as one of the classification keys 122, 124, 126 and 128 shown in FIG. 1.

The user interface event interpreting circuit, routine or application 770, under control of the controller 720, interprets the user's classification selection at the classification portion. The classifying circuit, routine or application 740, under control of the controller 720, re-classifies the image according to the interpreted classification selection, and updates the classification of the image in the classification portion 734.

The interface generating circuit, routine or application 760, under control of the controller 720, may also display related information related to the selected image to be re-classified, such as similar images and alternative version images, for the user to refer to during the re-classification process. That is, for a selected image to be re-classified, the retrieving circuit, routine or application 750, under control of the controller 720, retrieves related information that is related to the selected image to be re-classified. The interface generating circuit, routine or application 760, under control of the controller 720, displays the related information within, for example, a similar image portion and/or a version portion.

While this invention has been described in conjunction with the exemplary embodiments outlined above, it is evident that many alternative modifications and variations will be apparent to those skilled in the art. Accordingly, the exemplary embodiments of the invention set forth above, are intended to be illustrative, not limiting. Various changes may be made without departing from the spirit and scope of the invention.

What is claimed is:

1. An image classification device, comprising:
   a classifying circuit;
   a retrieving circuit;
   an interface generating circuit; and
   a user interface event interpreting circuit,
   wherein the interface generating circuit displays a first image and a plurality of symbols at a user interface, each of the symbols providing a visual indication of the image classification,
   wherein the retrieving circuit automatically determines from computed similarities whether images similar to the first image are found among images being classified, the images similar to the first image being displayed concurrently with the first image,
   wherein the user interface event interpreting circuit receives a one-key action from a user, the one-key action being pre-programmed to perform a pre-programmed classification,
   wherein the interface generating circuit displays a second image to be classified following the first image at the user interface upon receipt of the one-key action, and
   wherein the classifying circuit classifies the first image corresponding to the selected symbol.

2. The device of claim 1, wherein the second image is adjacent to the first image in a sequence of images.

3. The device of claim 2, wherein the sequence of images is arranged in an original sequence in which the images were generated.

4. The device of claim 2, wherein the sequence of images is a series of digital photographs.

5. The device of claim 1, wherein:
   the interface generating circuit displays a sequence of images at a user interface;
   the user interface event interpreting circuit, identifies a first image in the sequence of images; and
   the interface generating circuit displays an enlarged image of the first image in the sequence of images at the user interface concurrently with the displaying of the sequence of images.

6. The device of claim 5, further comprising a classifying circuit, wherein:

the interface generating circuit identifies a second image in the sequence of images upon receipt of the one-key action.

7. The device of claim 5, wherein the image sequence is arranged in an original sequence in which the images were generated.

8. The device of claim 5, wherein the image sequence is a series of digital photographs.

9. The device of claim 5, wherein:
the retrieving circuit retrieves at least one related image that is related to the first image in the sequence of images; and
the interface generating circuit displays the at least one related image.

10. The device of claim 9, wherein at least one of the at least one related image is an alternative version of the first image.

11. The device of claim 10, wherein at least one of the at least one alternative version is a touched-up version of the first image.

12. The device of claim 11, wherein the at least one touched-up version is created manually by a user.

13. The device of claim 11, wherein the at least one touched-up version is created by automatically applying at least one image enhancement to the first image.

14. The device of claim 5, wherein the interface generating circuit further displays a classification of at least one image in the image sequence.

15. The device of claim 14, wherein different classifications are associated with different visual indications.

16. The device of claim 15, wherein the different visual indications include different colors.

17. The device of claim 14, wherein the classification indicates at least one of an accepted image and a reject image, wherein an accepted image is displayed with original quality, and a reject image is displayed with reduced quality.

18. The device of claim 5, wherein the user interface event interpreting circuit identifies a second image in the sequence of images, and the interface generating circuit displays a second enlarged image concurrently with displaying the enlarged image, the second enlarged image corresponding to the second image in the sequence of images.

19. The device of claim 1, wherein:
the interface generating circuit displays a sequence of images on a user interface, each image in the sequence of images associated with a classification;
the user interface event interpreting circuit identifies a first image in the sequence of images;
the interface generating circuit identifies a second image in the sequence of images upon receipt of the one-key action; and
the classifying circuit re-classifies the first image in the sequence of images based on the one-key action.

20. The device of claim 19, wherein the image sequence is arranged in an original sequence in which the image sequence is generated.

21. The device of claim 19 wherein the image sequence is a series of digital photographs.

22. The device of claim 19, wherein different classifications are associated with different visual indications.

23. The device of claim 19, wherein the different visual indications include different colors.

24. The device of claim 19, wherein the classification indicates at least one of an accepted image and a reject image, wherein an accepted image is displayed with original quality, and a reject image is displayed with reduced quality.

25. The device of claim 19, wherein the retrieving circuit retrieves at least one related image that is related to the first image in the sequence of images, and the interface generating circuit displays the at least one related image.

26. The device of claim 25, wherein at least one of the at least one related image is an alternative version of the first image in the sequence of images.

27. The device of claim 26, wherein at least one of the at least one alternative version is a touched-up version of the first image in the sequence of images.

28. The device of claim 27, wherein at least one of the at least one touched-up version is created manually by a user.

29. The device of claim 27, wherein at least one of the at least one touched-up version is created by automatically applying at least one image enhancement to the first image.

30. The device of claim 25, wherein at least one of the at least one related image is an image that is similar to the first image in the sequence of images.

31. The device of claim 30, wherein at least one of the at least one similar image is automatically determined.

32. The device of claim 1, wherein:
the interface generating circuit concurrently displays a selected image and at least one related image, the at least one related image related to the selected image; and
the user interface event interpreting circuit receives the one-key action regarding the selected image.

33. The device of claim 32, wherein:
the interface generating circuit displays a next image upon receipt of the one-key action; and
the classifying circuit classifies the selected image according to the one-key action.

34. The device of claim 32, wherein the at least one related image is an alternative version of the selected image.

35. The device of claim 34, wherein the alternative version is a touched-up version of the selected image.

36. The device of claim 35, wherein the touched-up version is created manually by a user.

37. The device of claim 36, wherein the touched-up version is created by automatically applying at least one of image enhancement to the selected image.

38. The device of claim 32, wherein the at least one related image is an image that is similar to the selected image.

39. The device of claim 38, wherein the similar image is automatically determined.

40. A method for classifying images, comprising:
displaying a first image and a plurality of symbols, each of the symbols providing a visual indication of image classification;
automatically determining from computed similarities whether a similar image to the first image is found among the images:
displaying the similar image concurrently with the first image if the similar image is found;
receiving a one-key action from a user including selection from one of the symbols to obtain a selected symbol; and
performing a plurality of processes upon the receiving of the one-key action, the plurality of processes including:
classifying the first image corresponding to the selected symbol, and
displaying a second image to be classified following the first image.

41. The method of claim 40, wherein the second image is adjacent to the first image in a sequence of images.

42. The method of claim 41, wherein the sequence of images is arranged in an original sequence in which the images were generated.

43. The method of claim 41, wherein the sequence of images is a series of digital photographs.

44. A method of claim 40, further comprising:
concurrently displaying an image sequence and an enlarged image, the enlarged image corresponding to a selected image in the image sequence; and
classifying the selected image.

45. The method of claim 44, wherein classifying the selected image comprises:
receiving the one-key action from the user;
displaying a next image in the image sequence upon receipt of the one-key action; and
classifying the selected image according to the one-key action.

46. The method of claim 44, further comprising selecting the selected image of the image sequence.

47. The method of claim 44, wherein the image sequence is arranged in an original sequence in which the images were generated.

48. The method of claim 44, wherein the image sequence is a series of digital photographs.

49. The method of claim 44, further comprising:
retrieving a related image that is related to the selected image; and
displaying the related image concurrently with displaying the selected image.

50. The method of claim 49, wherein the related image is an alternative version of the selected image.

51. The method of claim 50, wherein the alternative version is a touched-up version of the selected image.

52. The method of claim 51, wherein the touched-up version is created manually by the user.

53. The method of claim 51, wherein the touched-up version is created by automatically applying at least one image enhancement to the selected image.

54. The method of claim 44, further comprising displaying a classification of at least one image in the image sequence.

55. The method of claim 54, wherein different classifications are associated with different visual indications.

56. The method of claim 55, wherein the different visual indications include different colors.

57. The method of claim 54, wherein the classification indicates at least one of an accepted image and a reject image, wherein an accepted image is displayed with original quality, and a reject image is displayed with reduced quality.

58. The method of claim 44, further comprising:
displaying a second enlarged image concurrently with displaying the enlarged image, the second enlarged image corresponding to a second selected image.

59. The method of claim 40, further comprising:
displaying an image sequence, at least one image in the image sequence associated with a classification; and
changing a classification of a first selected image of the image sequence.

60. The method of claim 59, wherein:
the at least one image comprises two or more images; and
the changing a classification of a first selected image comprises:
receiving the one-key action from the user;
selecting a second selected image in the image sequence in response to receiving the one-key action; and
re-classifying the first selected image according to the one-key action.

61. The method of claim 59, wherein the image sequence is arranged in an original sequence in which the image sequence is generated.

62. The method of claim 59, wherein the image sequence is a series of digital photographs.

63. The method of claim 59, wherein different classifications are associated with different visual indications.

64. The method of claim 63, wherein the different visual indications include different colors.

65. The method of claim 59, wherein the classification indicates at least one of an accepted image and a reject image, wherein an accepted image is displayed with original quality, and a reject image is displayed with reduced quality.

66. The method of claim 59, further comprising:
retrieving at least one related image that is related to the first selected image; and
displaying the at least one related image.

67. The method of claim 66, wherein at least one of the at least one related image is an alternative version of the first selected image.

68. The method of claim 67, wherein at least one of the at least one alternative version is a touched-up version of the first selected image.

69. The method of claim 68, wherein the touched-up version is created manually by a user.

70. The method of claim 68, wherein the touched-up version is created by automatically applying at least one image enhancement to the first selected image.

71. The method of claim 66, wherein at least one of the at least one related image is an image that is similar to the first selected image.

72. The method of claim 71, wherein at least one of the at least one similar image is automatically determined.

73. The method of claim 40, further comprising:
concurrently displaying a selected image and at least one related image, the at least one related image related to the selected image; and
classifying the selected image.

74. The method of claim 73, wherein classifying the selected image comprises:
receiving the one-key action from the user;
displaying a next image upon receipt of the one-key action; and
classifying the selected image according to the one-key action.

75. The method of claim 73, wherein the at least one related image is an alternative version of the selected image.

76. The method of claim 75, wherein the alternative version is a touched-up version of the selected image.

77. The method of claim 76, wherein the touched-up version is created manually by a user.

78. The method of claim 76, wherein the touched-up version is created by automatically applying at least one image enhancement to the selected image.

79. The method of claim 73, wherein the at least one related image is an image that is similar to the selected image.

80. The method of claim 79, wherein the similar image is automatically determined.

81. A method for classifying images of an image sequence, the method comprising:
displaying a film strip including the images of the image sequence;

displaying an enlarged view of a selected image from the images of the image sequence for classification, concurrently with the displaying a film strip;

computing similarities with the selected image to obtain zero or more similar images to the selected image;

displaying the zero or more similar images concurrently with the displaying an enlarged view of a selected image;

receiving a classification instruction; and classifying the selected image responsive to the classification instruction and automatically displaying an enlarged view of a next selected image for classification, the next selected image being contiguous to the selected image on the film strip.

82. The method of claim 81, further comprising displaying zero or more alternative versions of the selected image, concurrently with the displaying an enlarged view of a selected image.

83. The method of claim 82, wherein the alternative versions include cropped versions, touched up versions and enhanced versions, and wherein the classification instructions include an accept instruction, a neutral instruction and a reject instruction.

84. The method of claim 81 further comprising:

classifying a plurality of the images of the image sequence to obtain classified images;

displaying the classified images in a light table format to obtain displayed classified images; and displaying an indication of the classification instruction corresponding to each of the displayed classified images together with each of the displayed classified images.

* * * * *